(12) United States Patent
Tsujimoto

(10) Patent No.: US 8,910,304 B2
(45) Date of Patent: Dec. 9, 2014

(54) INFORMATION PROCESSING DEVICE AND MULTIFUNCTION PERIPHERAL

(71) Applicant: Sharp Kabushiki Kaisha, Osaka-Shi, Osaka (JP)

(72) Inventor: Kunihiko Tsujimoto, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 19 days.

(21) Appl. No.: 13/660,511

(22) Filed: Oct. 25, 2012

(65) Prior Publication Data

US 2013/0133085 A1   May 23, 2013

(30) Foreign Application Priority Data

Nov. 21, 2011   (JP) ................................. 2011-254408

(51) Int. Cl.
| | | |
|---|---|---|
| *G06F 7/04* | (2006.01) | |
| *G06F 21/60* | (2013.01) | |
| *G06F 21/62* | (2013.01) | |
| *H04N 1/00* | (2006.01) | |

(52) U.S. Cl.
CPC ............ *G06F 21/60* (2013.01); *G06F 21/6245* (2013.01); *H04N 1/00* (2013.01); *H04N 1/00222* (2013.01); *H04N 2201/0094* (2013.01)
USPC ................... 726/28; 726/27; 726/29; 726/30; 713/161; 713/162; 713/163; 713/164

(58) Field of Classification Search
CPC ......................... G06F 21/6245; G06F 21/6218
USPC ........................................ 726/34, 28; 707/102
See application file for complete search history.

(56) References Cited

U.S. PATENT DOCUMENTS

| | | | |
|---|---|---|---|
| 2005/0114389 A1* | 5/2005 | Kamiya | ................... 707/102 |
| 2007/0159663 A1 | 7/2007 | Tsujimoto | |
| 2011/0134456 A1 | 6/2011 | Tsujimoto | |
| 2012/0302705 A1 | 11/2012 | Kodate et al. | |

FOREIGN PATENT DOCUMENTS

| | | |
|---|---|---|
| JP | 2002-149553 A | 5/2002 |
| JP | 2005-157657 A | 6/2005 |
| JP | 2007-174400 A | 7/2007 |
| JP | 2007-280255 A | 10/2007 |
| JP | 2010-146408 A | 7/2010 |
| JP | 2011-124652 A | 6/2011 |
| JP | 2011-130117 A | 6/2011 |

* cited by examiner

*Primary Examiner* — Longbit Chai
(74) *Attorney, Agent, or Firm* — Edwards Wildman Palmer LLP; David G. Conlin; David J. Silvia

(57) ABSTRACT

A control API controls secret data to be stored in a secret data storage area which is accessible only to the control API. Moreover, the control API controls the file information storing part in the secret data storage area to store (i) storing location information of the stored secret data and (ii) administrative storage location information notified by the web application so that the storing location information and the administrative storage location information are associated with each other. This makes it possible to (i) prevent a leakage of confidential information and (ii) allow an authorized web application to easily use the confidential information.

6 Claims, 11 Drawing Sheets

FIG. 4

PLEASE ENTER LICENSE KEY OF APPLICATION

KEY :

OK

INFORMATION PROCESSING DEVICE AND MULTIFUNCTION PERIPHERAL

This Nonprovisional application Claims priority under 35 U.S.C. §119 on Patent Application No. 2011-254408 filed in Japan on Nov. 21, 2011, the entire contents of which are hereby incorporated by reference.

TECHNICAL FIELD

The present invention relates to an information processing device including a web server section for executing a web application.

BACKGROUND ART

Conventionally, a multifunction peripheral control system has been known which controls functions of a multifunction peripheral having a plurality of functions such as a copying function, a scanning function, a printing function, and a fax sending/receiving function. According to the multifunction peripheral control system, the functions of the multifunction peripheral are controlled by an application program that runs on other device connected with the multifunction peripheral via a communication network. In such kind of multifunction peripheral control system, a multifunction peripheral is arranged to cooperate with an application program that runs on a network, and this makes it possible to provide a function which cannot be achieved only by the multifunction peripheral.

For example, Patent Literatures 1 and 2 disclose techniques in which an operation screen of a multifunction peripheral is configured to serve as a browser so that operation screen information and control information are obtained from an application program. According to the techniques of Patent Literatures 1 and 2, the application program is operated as a web application on (i) a personal computer (PC) or a server device on a network or (ii) a web application execution environment (web server) in the multifunction peripheral.

Note that a technique for appropriately managing data of an application installed in an information terminal is disclosed in, for example, Patent Literature 3. According to the technique of Patent Literature 3, a first area in which the application is stored and a second area in which user data corresponding to the application are managed in an integrated manner. In this configuration, it is possible to select whether (i) to delete the user data when the application is deleted or (ii) to delete only the application while leaving the user data when the application is deleted.

CITATION LIST

Patent Literatures

[Patent Literature 1]
Japanese Patent Application Publication Tokukai No. 2007-174400 A (Publication date: Jul. 5, 2007)
[Patent Literature 2]
Japanese Patent Application Publication Tokukai No. 2011-124652 A (Publication date: Jun. 23, 2011)
[Patent Literature 3]
Japanese Patent Application Publication Tokukai No. 2005-157657 A (Publication date: Jun. 16, 2005)

SUMMARY OF INVENTION

Technical Problem

With regard to an information processing device which can execute a plurality of web applications, in a case where each of the plurality of web applications is executed in an environment in which the each of the plurality of web applications is not protected, there is a risk that data in a file system in which a web application is stored is exploited or tampered by an unauthorized another web application which is being executed by a web server. In a case where, for example, applications A and B are operated with the use of a single storage area, there is a possibility that confidential information regarding the application B is leaked if the application A (i) accesses data of the application B and (ii) transmits, without authorization, the data to an external device communicably connected.

Under the circumstances, the plurality of web applications are generally operated with the use of storage areas which are protected for the respective plurality of web applications, in order to prevent such a security threat. That is, although the web application A can freely carry out a process using a storage area which is accessible only to the web application A, the web application A cannot access a storage area storing data of another web application (such as a web application B or C). Such a security model is generally called "sandbox security model".

However, it is sometimes impossible to appropriately prevent a leakage of confidential information, merely by operating web applications by using respective storage areas protected for the respective web applications as above described. For example, in a case where (i) a web application A is installed in an information processing device and then (ii) pieces of confidential information such as setting information of the web application A and user information are stored in a data storage area which is accessible only to the web application A, it is possible to reduce the risk that data stored in the data storage area is accessed by another web application.

However, because the web application A is a web application, in a case where confidential data is stored in a data storage area (hereinafter, referred to as "public data storage area") which is under the control of the web application, there is a possibility that the confidential data is accessed by an unauthorized device such as an external device by the use of an HTTP (Hyper Text Transfer Protocol) request or the like. Note that, even if a leakage prevention measure such as a fire wall is provided for prohibiting an HTTP access to the multifunction peripheral from outside, there still remains a possibility that information is read, tampered, or deleted via other web application installed in the multifunction peripheral.

In view of this, it is conceivable that (i) a storage area for storing user data is set to an area other than a storage area for storing an application as in Patent Literature 3 and (ii) an access from a web application to the storage area for storing user data is restricted (this configuration is conceived by the applicant of this application and is not a known configuration).

However, in order to cause the operation screen to display screen data of the web application in which screen data the user data is reflected, the user data needs to be stored in a storage area (corresponding to the "application area" of Patent Literature 3) storing the web application.

Therefore, confidential information (secret data) such as user data used in a first web application needs to be stored such that (i) an access from a second web application or an external device is blocked whereas (ii) the first web application can easily access the confidential information (secret data).

The present invention is accomplished in view of the problems, and its object is to provide an information processing device having a web application execution environment, which device can (i) prevent a leakage of confidential information and (ii) allow an authorized web application to easily use the confidential information.

Solution to Problem

In order to attain the object, an information processing device of the present invention includes a web server section for executing a web application; a data storing section for storing data used in the web application; and a data managing section for managing data to be stored in the data storing section, in a case where the web application controls the data storing section to store secret data which is opened only to the web application, the web application notifying the data managing section of (i) a data name of the secret data and (ii) administrative storage location information of the secret data in the web application, the data managing section controlling the secret data to be stored in a secret data storage area in the data storing section, which secret data storage area is (i) different from a storage area corresponding to the administrative storage location information and (ii) accessible only to the data managing section, and the data managing section controlling correspondence information to be stored in the secret data storage area, the correspondence information being indicative of a correspondence between (i) storing location information indicative of a location in which the secret data is actually stored and (ii) the administrative storage location information notified by the web application.

Advantageous Effects of Invention

According to the present invention, it is possible to provide an information processing device having a web application execution environment, which device can (i) prevent a leakage of confidential information and (ii) allow an authorized web application to easily use the confidential information.

BRIEF DESCRIPTION OF DRAWINGS

FIG. 4 is an explanatory view illustrating an example of an operation screen displayed, in the process illustrated in FIG. 3, on a display section of the multifunction peripheral.

Figure 1:
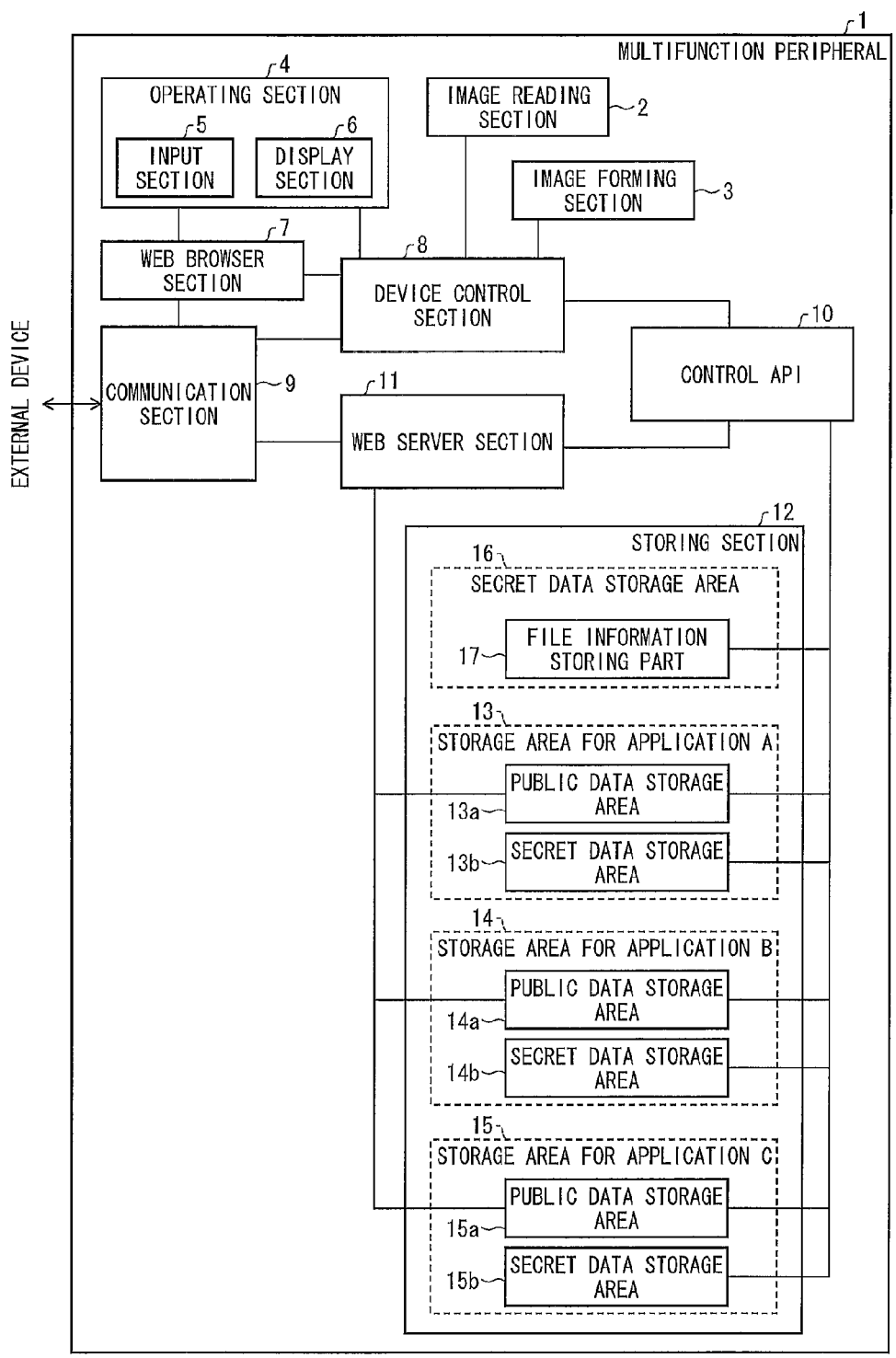
FIG. 1 is an explanatory view illustrating a configuration of a multifunction peripheral (information processing device), in accordance with an embodiment of the present invention.
Figure 5:
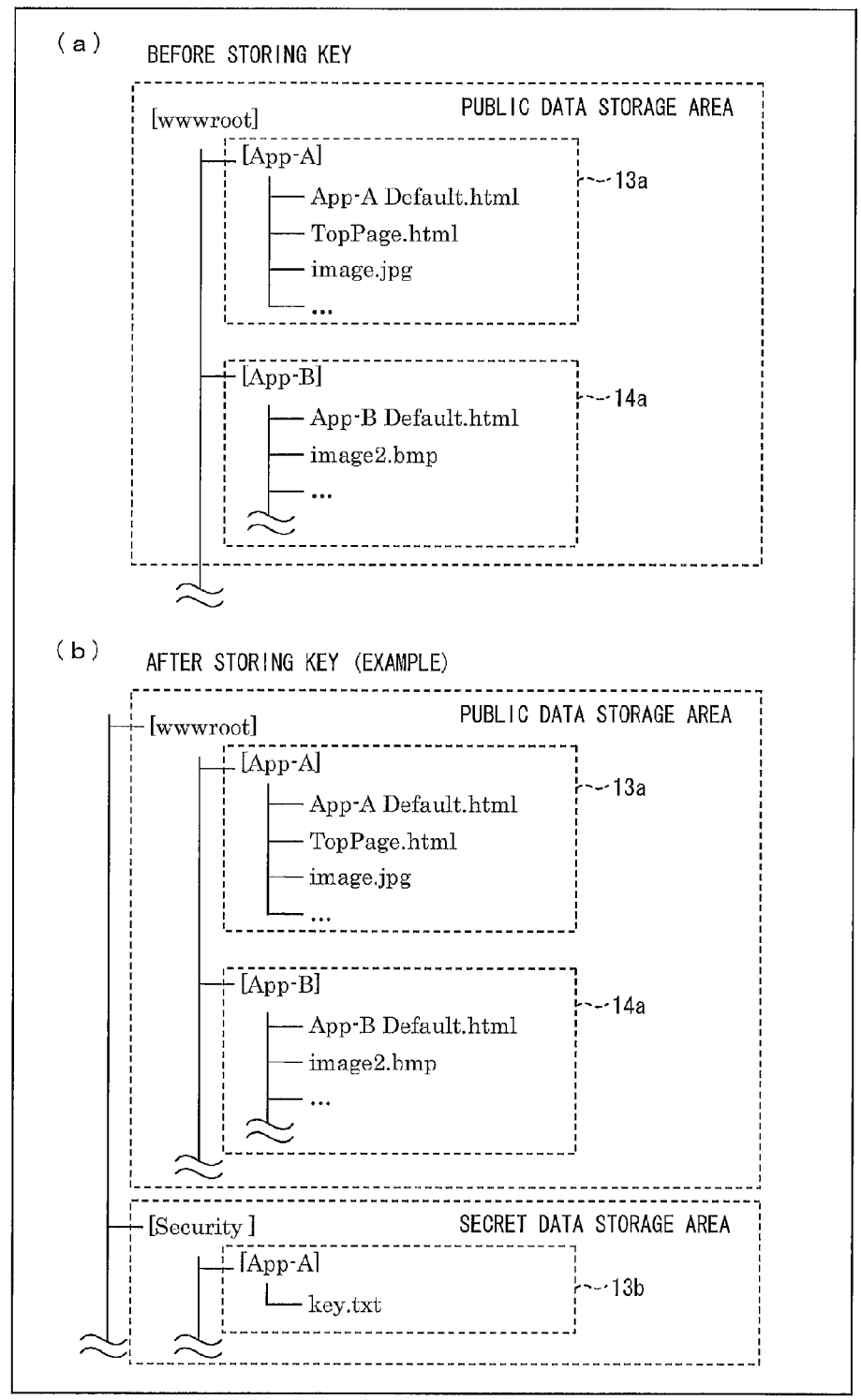
FIG. 5

(a) of FIG. 5 is an explanatory view illustrating a configuration of a public data storage area for web applications stored in the multifunction peripheral illustrated in FIG. 1. (b) of FIG. 5 is an explanatory view illustrating a configuration of a public data storage area and a secret data storage area for the web applications.

Figure 6:
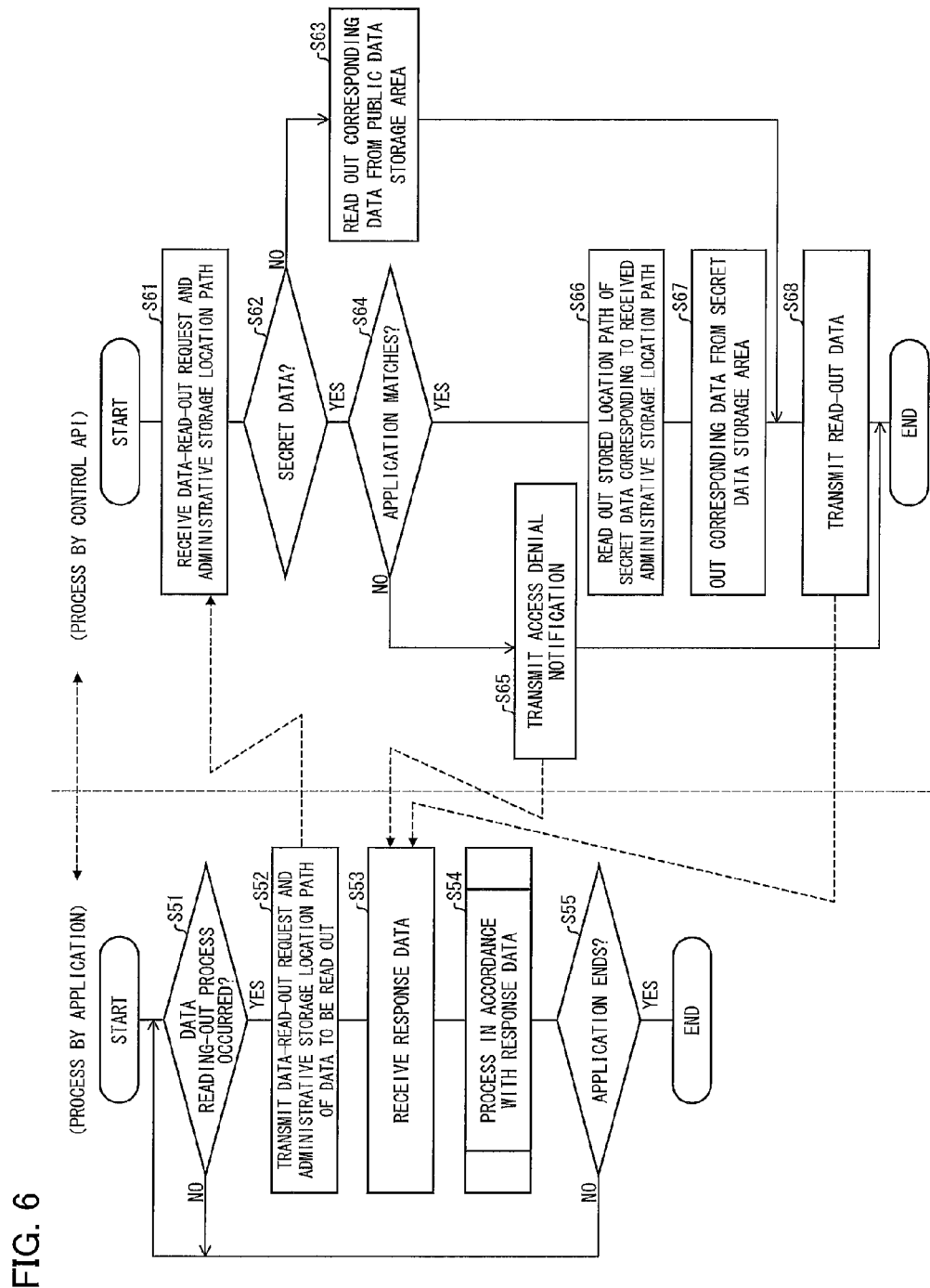

FIG. 6 is a flowchart illustrating a flow of processes carried out when a web application reads out data stored in a storing section, in the multifunction peripheral illustrated in FIG. 1.

Figure 7:
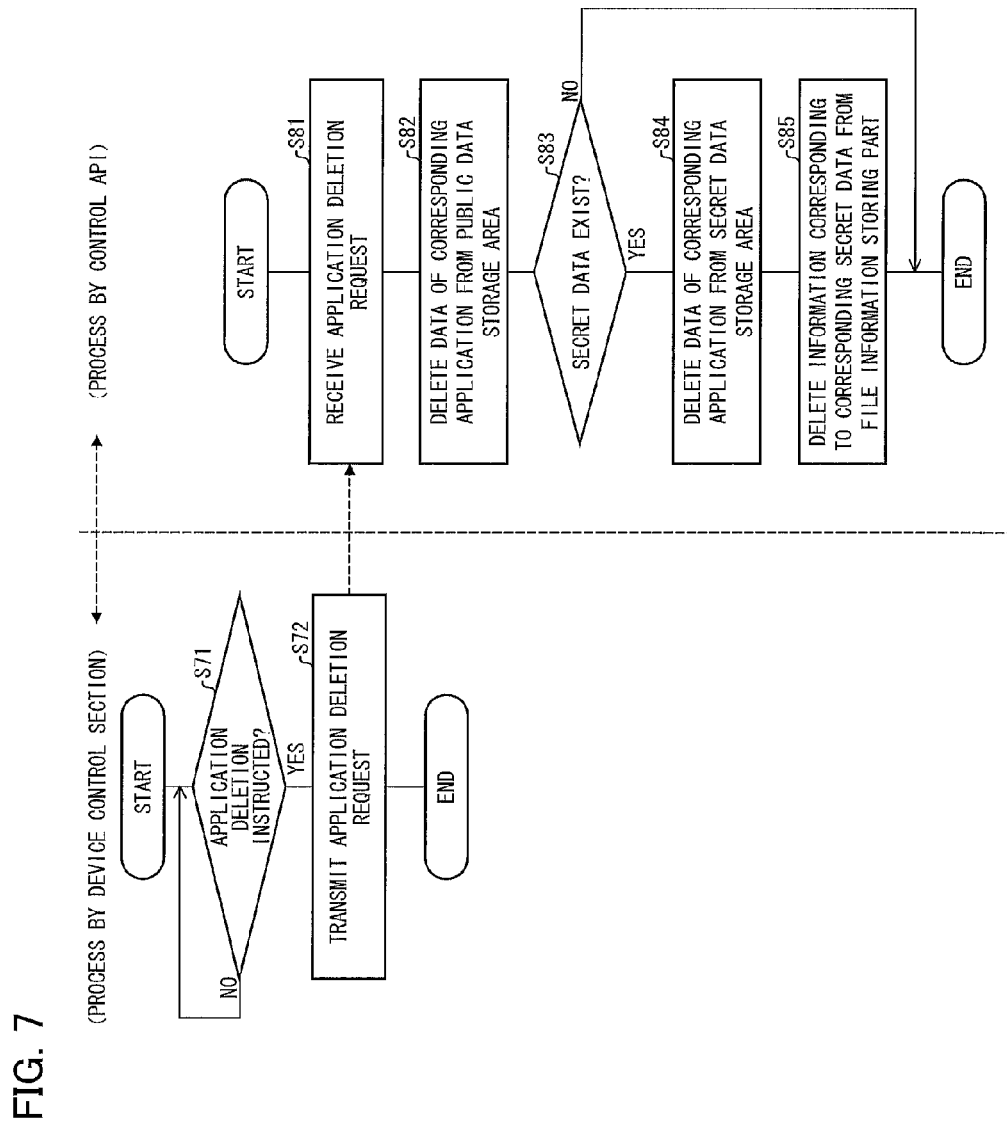

FIG. 7 is a flowchart illustrating a flow of processes carried out for deleting a web application installed in the multifunction peripheral illustrated in FIG. 1.

Figure 8:
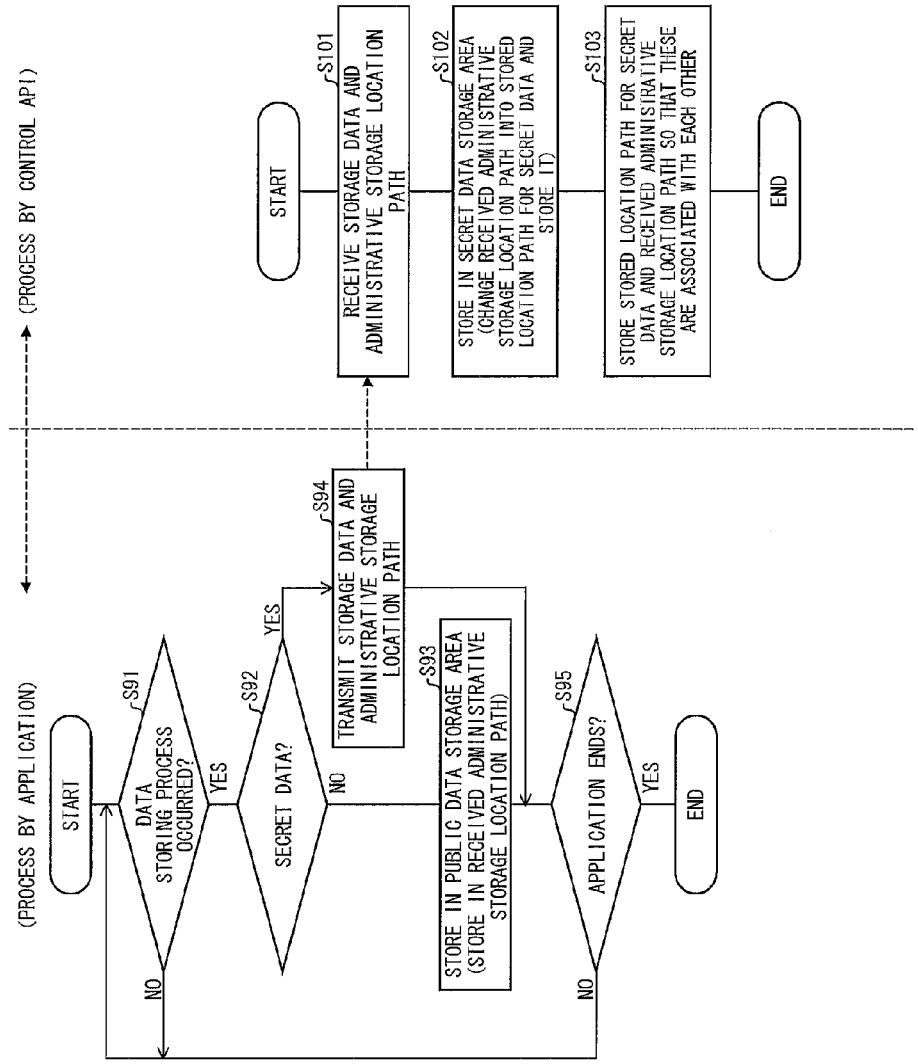

FIG. 8 is a flowchart illustrating another example of processes carried out when a web application controls data to be stored in a storing section, in the multifunction peripheral illustrated in FIG. 1.

Figure 9:
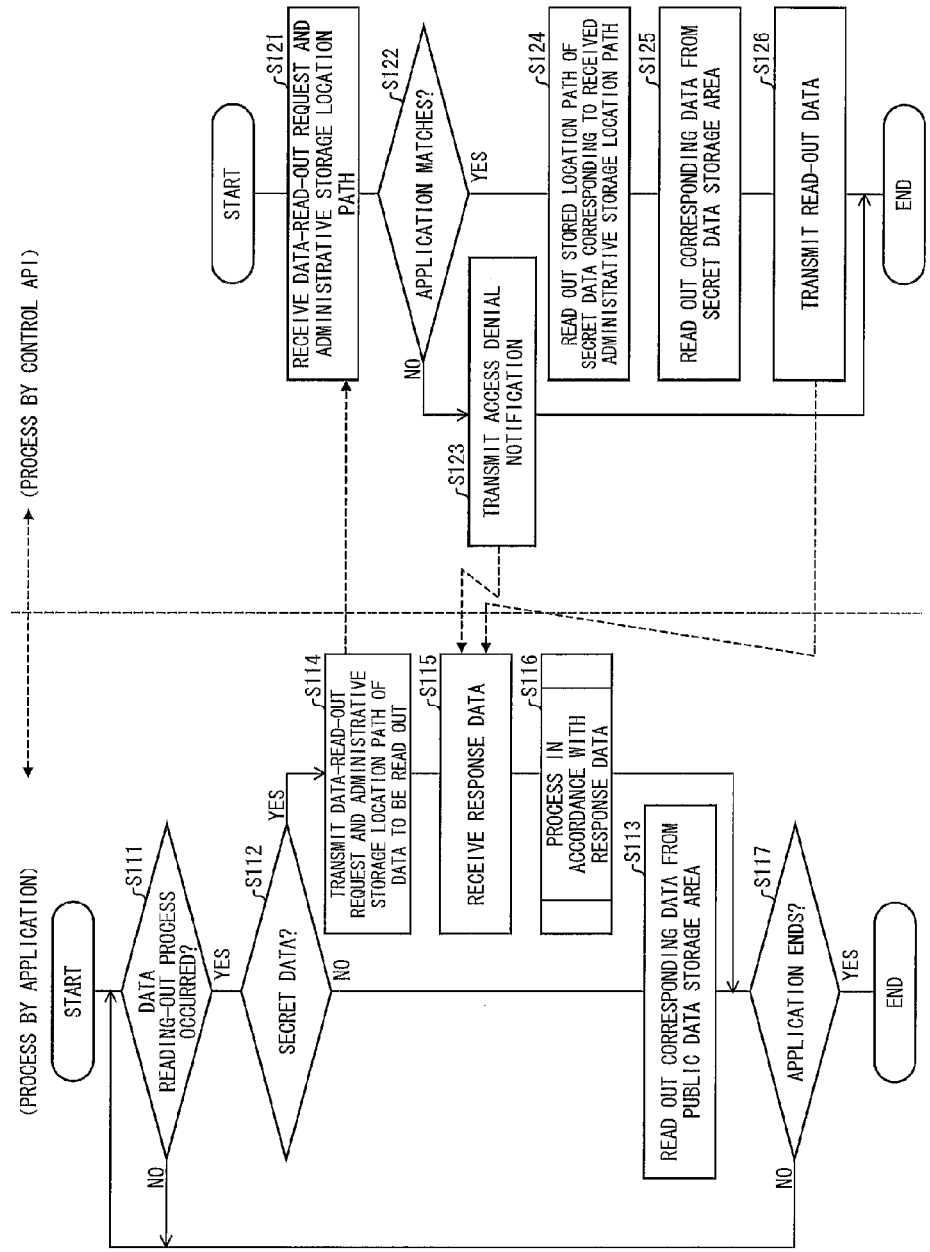

FIG. 9 is a flowchart illustrating another example of processes carried out when a web application reads out data stored in a storing section, in the multifunction peripheral illustrated in FIG. 1.

Figure 10:
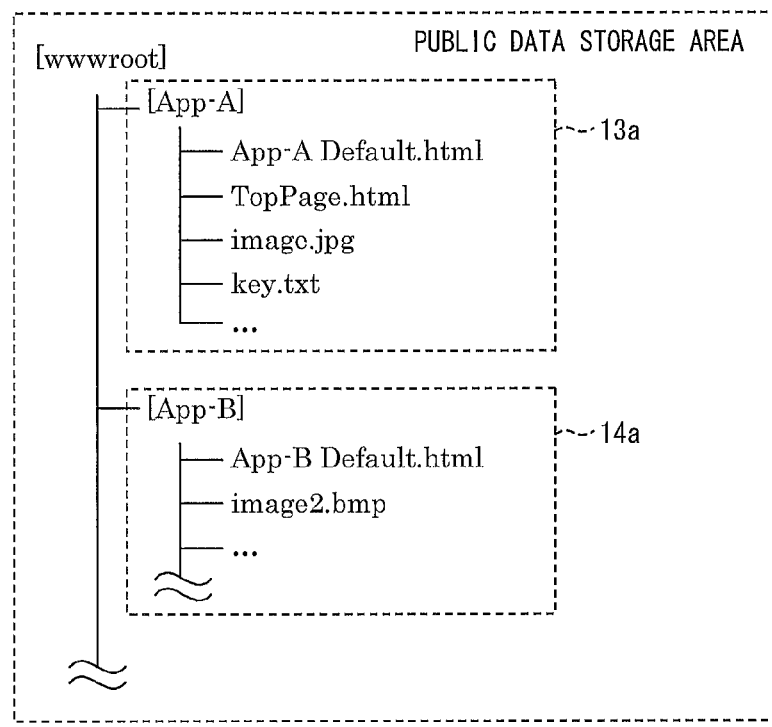

FIG. 10 is an explanatory view illustrating a configuration of a data storage area of a comparative example, where pieces of secret data of respective web applications are stored in a public data storage area.

Figure 11:
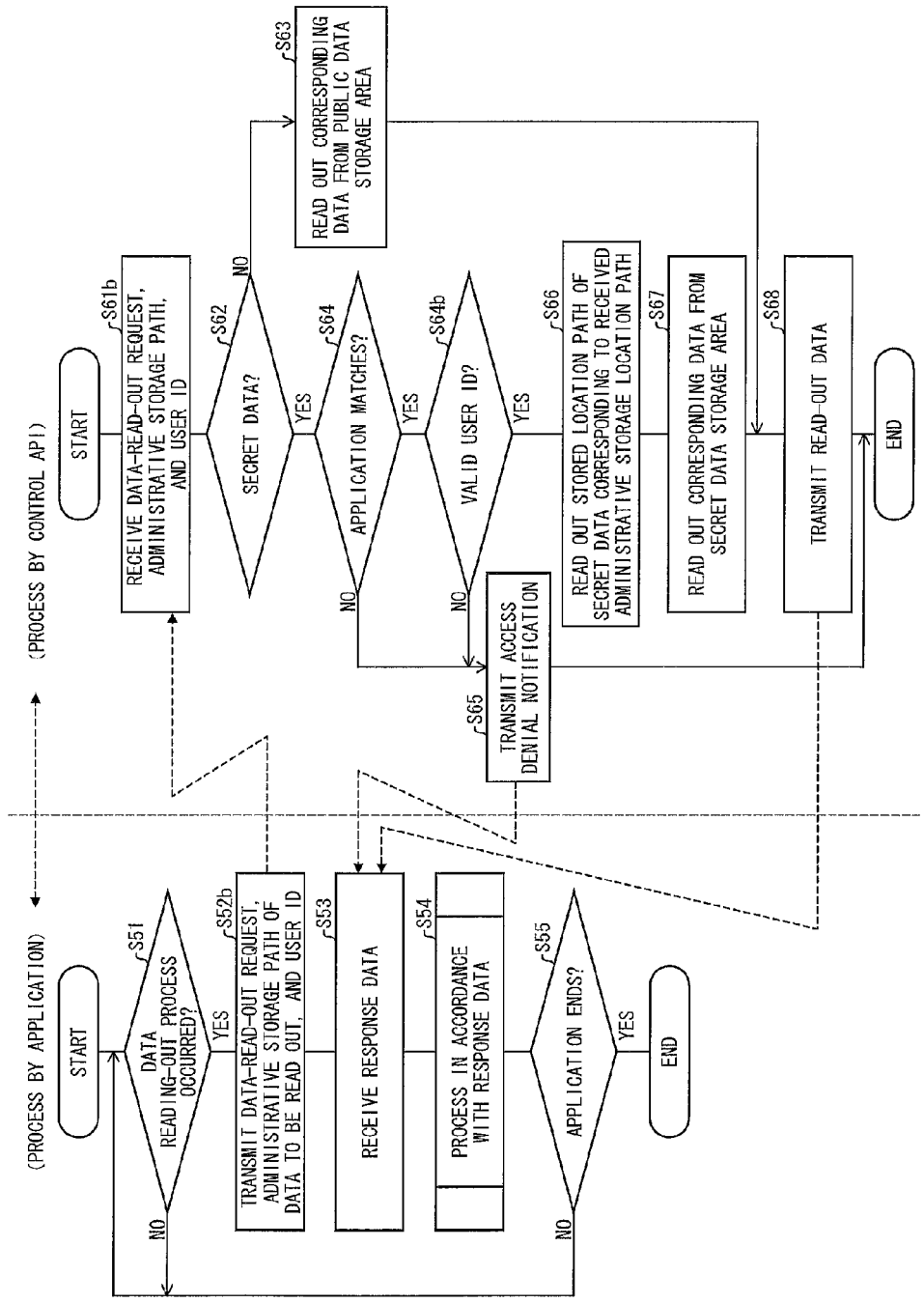

FIG. 11 is a flowchart illustrating a modification of processes carried out when a web application reads out data stored in a storing section, in the multifunction peripheral illustrated in FIG. 1.

DESCRIPTION OF EMBODIMENTS

The following description will discuss an embodiment of the present invention.

(1-1. Configuration of Multifunction Peripheral 1)

FIG. 1 is an explanatory view illustrating a configuration of a multifunction peripheral 1, in accordance with the present embodiment. The multifunction peripheral 1 includes an image reading section 2, an image forming section 3, an operating section 4, a web browser section 7, a device control section 8, a communication section 9, a control API (application interface) 10, a web server section 11, and a storing section 12 (see FIG. 1). The operating section 4 includes an input section 5 and a display section 6. The storing section 12 stores one or more web applications (applications A through C in a case of an example of FIG. 1) which are to be executed in the web server section 11. The operating section 4 is a user interface which (i) notifies a user of information and (ii) accepts an input entered by the user. Specifically, the operating section 4 includes (i) a display section 6 such as a liquid crystal display and (ii) an input section 5 having various kinds of input keys. Note that the operating section 4 can be a touch panel integrally configured by the display section 6 and the input section 5.

The image reading section 2 includes a scanner (not illustrated) and a document carrying section (not illustrated) which carries a document to the scanner. The image reading section 2 reads, for example characters and/or images printed on a document so as to obtain image data of the document. Note that a configuration of the image reading section 2 is not limited to a particular one, and any kind of conventionally-known image reading device can be employed as the image reading section 2.

The image forming section 3 prints, on a recording material such as a sheet, an image (such as characters, photographs, and/or graphics) in accordance with supplied image data. The present embodiment employs, as the image forming section 3, an electrophotographic image forming apparatus which includes components such as a photoreceptor drum, a charging device, an exposure device, a developing device, a transfer device, a fixing device, and a sheet tray. Note, however, that the image forming section 3 is not limited to such a configuration. Alternatively, an image forming apparatus, employing another image forming method such as an ink-jet method, can be employed as the image forming section 3.

The communication section 9 is a communication interface via which it is possible to communicate with an external device (such as a personal computer, a server device, or an information processing terminal) which is connected with the communication section 9 via a communication network. The communication section 9 also has a function to access the web server section 11 provided in the multifunction peripheral 1. In a case where a destination of access is an IP address of the multifunction peripheral 1, the communication section 9 accesses the access destination in the multifunction peripheral 1. Note that, in a case where the IP address of the multifunction peripheral 1 is specified, a loop-back address is specified. The loop-back address (i) is a virtual IP address assigned to a loop-back interface such as a network card (e.g., hardware serving as a communication section) and (ii) is an IP address which indicates, in this case, the multifunction peripheral 1. The loop-back address is a known address used in general-purpose web browsers. In a case where a loop back address is employed in a multifunction peripheral, any packet data will not be transmitted outside of the multifunction peripheral. This allows a reduction in time period such as (i) a time period for accessing a DNS (Domain Name System) server in order to solve an address name and/or (ii) a time period for communicating with an information processing device. It is therefore possible to display an operation screen more quickly, as compared with a case where HTML (Hypertext Markup Language) data is obtained from an information processing device. According to the present embodiment, the communication section 9 communicates with the applications A through C, which run on the web server section 11, with the use of an HTTP.

The web browser section 7 operates in accordance with a general-purpose web browsing software. The web browser section 7 has (i) a function to browse an operation screen (web page) displayed in accordance with a web application executed by the web server section 11 and (ii) a function to transmit data, which has been entered by the user from the input section 5, to the web server section 11. The web browser section 7 further has (i) a function to browse a web page in accordance with a web application executed by a web server of an external device which is communicably connected with the web browser section 7 via the communication section 9 and (ii) a function to transmit data, which has been entered by the user from the input section 5, to the web server of the external device.

The web server section 11 operates in accordance with software of a general-purpose web server. Here, the web server is software for providing a function of a server device which constitutes the WWW (World Wide Web) that is an information system on the Internet. The web server section 11 (i) receives a request (HTTP request) from the web browser section 7, (ii) executes a web application in accordance with the request, and (iii) transmits a response (HTTP response) to the web browser section 7.

The control API (data managing section) 10 carries out a process in accordance with an instruction issued by a web application which runs on the web server section 11. Specifically, in a case where the control API 10 needs to control any of functions (e.g., a copying function, a scanning function, and a fax transmission function) of the multifunction peripheral 1, the control API 10 transmits a control command for controlling the function to the device control section 8.

Specifically, the multifunction peripheral 1 has a plurality of device functions such as (a) a function of the image reading section 2 to read image, (b) a function of the image forming section 3 to form an image, and (c) a function of the communication section 9 to communicate. The control API (data managing section) 10 controls each of the functions in accordance with a corresponding instruction issued by a web application that runs on the web server section 11. This causes a corresponding one of the functions (e.g., the copying function, the scanning function, or the fax sending function) to be executed. The control API 10 serves also as a data managing API (data managing section) which carries out, with respect to the storing section 12, a process such as data writing, data reading, or data deleting.

The device control section 8 controls functions of the multifunction peripheral 1. Specifically, the device control section 8 controls operations of respective sections such as the image reading section 2, the image forming section 3, the communication section 9, and the operating section 4. The device control section 8 controls, for example, (i) the image reading section 2 to obtain data of a scanned image, (ii) the image forming section 3 to form (output), on a recording material, an image in accordance with supplied image data, and (iii) the communication section 9 to carry out a process such as (a) a process in which supplied image data is stored in a specified external resource or (b) a process in which supplied image data is transmitted to a specified address by e-mail.

Note that the device control section 8 has an inherent operation mode and a cooperation operation mode. In a normal state (e.g., immediately after turning on the multifunction peripheral 1), the device control section 8 controls the display section 6 to display a basic operation screen in accordance with basic operation screen data stored in the multifunction peripheral 1. Then, the device control section 8 selects the inherent operation mode or the cooperation operation mode, in accordance with a mode selection instruction issued by the user with respect to the basic operation screen. Alternatively, the device control section 8 selects an application belonging to the inherent operation mode or an application belonging to the cooperation operation mode.

In the inherent operation mode, the device control section 8 executes an application (native application), which has been stored in the multifunction peripheral 1 in advance and is inherent to the multifunction peripheral 1, so that the display section 6 displays an operation screen in accordance with the application. Then, the device control section 8 (i) receives, via the input section 5, an instruction which has been entered from the operation screen and (ii) carries out a corresponding one of the above described controls in accordance with the instruction.

In the inherent operation mode, the device control section 8 also controls, for example, the display section 6 to display, on an operation screen, an appropriate combination of pieces of image information of respective parts of the multifunction peripheral 1 in accordance with a current configuration of and/or a current state of the multifunction peripheral 1. Note that the inherent operation mode is a general mode which is employed in a conventional multifunction peripheral. In the inherent operation mode, the device control section 8 runs on an OS which runs on a main control section (not illustrated) of the multifunction peripheral 1, and the device control section 8 carries out a function such as a copying function, a facsimile function, or a printer function, by executing a native application.

In the cooperation operation mode, the device control section 8 controls each of the sections of the multifunction peripheral 1 in cooperation with a web application which runs on the web server section 11. Specifically, the web server section 11 runs on the main control section (not illustrated) of the multifunction peripheral 1, and an execution environment in which web applications (applications A through C) are executed is secured on a program of the web server section 11.

In a case where an instruction on selecting the cooperation operation mode is entered, the device control section 8 controls the web browser section 7 (i) to be booted up, (ii) to access a predetermined URL (Uniform Resource Locator) (in the present embodiment, a URL for requesting the web server section 11 to transmit an initial operation screen), and (iii) to carry out a process in accordance with information described in the predetermined URL. In the cooperation operation mode, the device control section 8 (i) accepts a control command from the control API 10 and (ii) carries out a control in accordance with the control command.

Each of the applications A through C is a web application which runs on the web server section 11. When a start button of any of the applications A through C is selected on an operation screen displayed on the display section 6, the web browser section 7 (i) accesses the web server section 11 with the use of a loop-back address, (ii) receives HTML (Hypertext Markup Language) data indicative of an operation screen which HTML data is stored in a public data storage area of a selected application (e.g., public data storage areas 13*a*, 14*a*, or 15*a* for the respective applications A through C), and (iii) controls the display section 6 to display the operation screen indicated by the HTML data. Then, the multifunction peripheral 1 carries out any of the functions in accordance with an instruction entered from the operation screen.

The storing section (data storing section) 12 has (i) a data storage area 13 for application A, (ii) a data storage area 14 for application B, (iii) a data storage area 15 for application C, and (iv) a secret data storage area 16.

The data storage area 13 stores a web application A and data used in the web application A. The data storage area 14 stores a web application B and data used in the web application B. The data storage area 15 stores a web application C and data used in the web application C.

The data storage area 13 has a public data storage area 13*a* and a secret data storage area 13*b*, the data storage area 14 has a public data storage area 14*a* and a secret data storage area 14*b*, and the data storage area 15 has a public data storage area 15*a* and a secret data storage area 15*b*.

The public data storage areas 13*a*, 14*a*, and 15*a* store (i) the respective applications A through C and (ii) pieces of data, which are not required to be confidential (i.e., which can be open to public; hereinafter, referred to as "non-confidential data"), out of pieces of data used in the applications A through C. The pieces of data (files) stored in the public data storage areas 13*a*, 14*a*, and 15*a* are accessible to a general-purpose file accessing system which is prepared for an execution environment, in which an application is executed, on the web server section 11. Examples of the non-confidential data encompass an access log. An administrator uses the access log so as to manage the number of use of or a frequency of use of an application. The access log is like data in which, each time when the application is booted up by somebody, the each time is recorded. Such non-confidential data is accessibly stored with the use of a file accessing system which is used on the web server section 11. The non-confidential data is thus stored in an accessible storage area with the use of a normal file accessing system. It is therefore possible to suppress an increase in storage capacity of secret data storage areas (described below).

The secret data storage areas 13*b*, 14*b*, and 15*b* store pieces of data, which are required to be confidential (hereinafter, referred to as "confidential data"), out of the pieces of data used in the applications A through C. The pieces of data (files) stored in the secret data storage areas 13*b*, 14*b*, and 15*b* (i) are not directly accessible to the general-purpose file accessing system prepared in execution environment, in which the application is executed, on the web server section 11 but (ii) are accessible only via the control API 10.

The secret data storage area 16 has a file information storing part 17. The file information storing part 17 stores a correspondence between (i) storing location paths (storing location information) of respective files stored in the respective secret data storage area 13*b*, 14*b*, and 15*b* and (ii) administrative storage location paths (administrative storage location information) of the respective files in a file system of the web server section 11. Specifically, in a case where an application that runs on the web server section 11 requests the control API 10 to store secret data, the control API 10 (i) changes an administrative storage location path (administrative storage location information) specified by the web server section 11 into a storing location path (storing location information) corresponding to a secret data storage area and (ii) controls the file information storing part 17 to store the administrative storage location path (administrative storage location information) specified by the web server section 11 and the storing location path (storing location information) indicative of a location in the secret data storage area, in which location the secret data has been actually stored, so that the administrative storage location path and the storing location path are associated with each other.

(1-2. Operation of Multifunction Peripheral 1)
(1-2-1. Data Storing Process)

Figure 2:
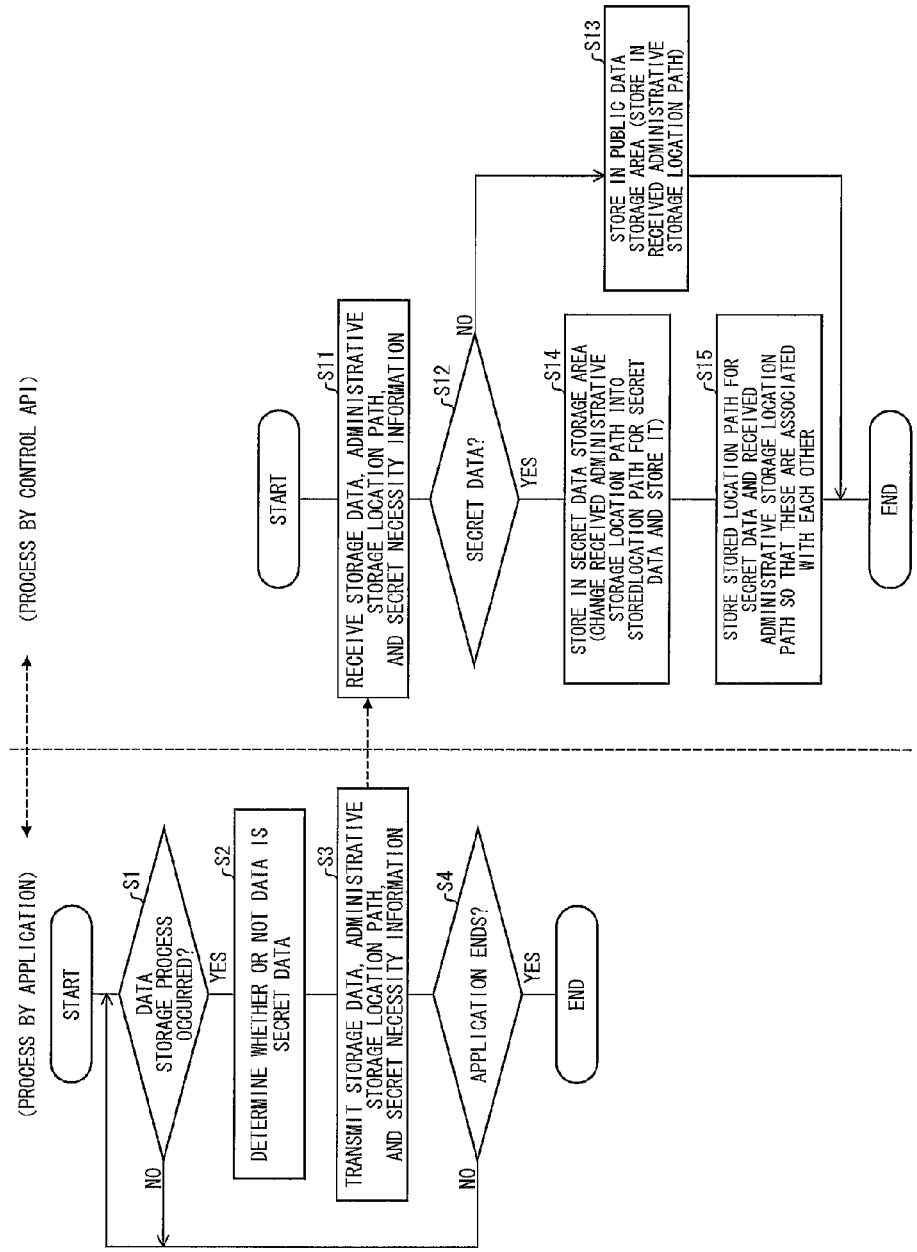
FIG. 2 is a flowchart illustrating a flow of processes carried out when a web application controls data to be stored in a storing section, in the multifunction peripheral illustrated in FIG. 1.

The following description will discuss a process in which an application (web application), which runs on the web server section 11, controls the storing section 12 to store data. FIG. 2 is a flowchart showing a flow of processes in which an application that runs on the web server section 11 controls the storing section 12 to store data used in the application.

First, an application (web server section 11) judges whether or not a process (data storing process), in which data is stored in the storing section 12, has occurred (S1).

In a case where a data storing process has occurred, the application determines whether or not the data to be stored is secret data, that is, determines whether (i) to control the storing section 12 to store the data so that the data is arbitrarily accessible from outside or (ii) to control the storing section 12 to store the data so that the data is accessible only via the control API 10 (S2). Specifically, criteria such as an item, a type, and an attribute of data which should be treated as secret data are preset in the application. Based on such preset criteria, the application determines whether or not data should be treated as secret data. Examples of data to be treated as secret data encompass user authentication information (such as a login ID, a password, and a license key), personal information of the user (such as a name, an address, a phone number, and an e-mail address), information specified as secret data by the user, and setting information of the application.

Then, the application transmits, to the control API 10, (i) storage data which is to be stored, (ii) an administrative storage location path for specifying a location in which the storage data is to be stored, and (iii) secret necessity information indicative of whether or not the storage data is secret data (S3). A structure of the secret necessity information is not limited to a particular one, provided that the control API 10 can judge whether or not storage data is secret data based on secret necessity information. For example, a function to be notified to the control API 10, can be changed depending on whether or not the storage data is secret data. Alternatively, a parameter of a function can be changed depending on whether or not the storage data is secret data. In a case where, for example, an application A that runs on the web server section 11 controls, via the control API 10, the storing section 12 to store data (key.txt) in a secret data storage area of the storing section 12, the application A uses a function "file ( )". When "file=file (wwwroot/App-A/key.txt)" is executed, the execution environment, in which the application is executed, on the web server section 11 calls the control API (data managing API) 10 so that the control API 10 controls the data (key.txt) to be stored in the secret data storage area.

After the step S3, the application determines whether or not the application should end (S4). In a case where the application determines not to end, the process returns to the step S1.

When the control API (data managing API, data managing section) 10 receives the storage data, the administrative storage location path, and the secret necessity information from the application (web server section 11) (S11), the control API 10 judges whether or not the storage data is secret data based on received secret necessity information (S12).

In a case where the control API 10 determines that the storage data is not secret data, the control API 10 controls the storage data, which has been received from the application (web server section 11), to be stored in a storage area corresponding to a received administrative storage location path (S13), and then the process is ended.

On the other hand, in a case where the control API 10 determines that the storage data is secret data, the control API 10 (i) changes the administrative storage location path, which has been received from the application (web server section 11), into another storage location path (storing location path; which corresponds to a secret data storage area) for storing secret data and then (ii) controls the storage data, which has been received from the application, to be stored in a location indicated by the another storage location path (storing location path) (S14). That is, in a case where the control API 10 determines that the storage data is secret data, the control API 10 controls the storage data, which has been received from the application (web server section 11), to be stored in a secret data storage area.

Subsequently, the control API 10 controls a file information storing part 17 of the storing section 12 to store correspondence information (S15), and then the process is ended. Note that the correspondence information is indicative of a correspondence between (i) the storing location path (storing location information) of the secret data storage area in which the storage data is stored in the step S14 and (ii) the administrative storage location path (administrative storage location information) received from the application in the step S11.

According to each of the secret data storage area and the public data storage area of the present embodiment, folders are prepared for respective applications so that data of each of the applications is to be stored in a folder prepared for the each of the applications. It follows that information (such as an application name) for specifying an application is contained in each of (i) a storing location path (storing location information) of a secret data storage area in which storage data has been actually stored and (ii) an administrative storage location path (administrative storage location information) of which the application has notified the control API 10. Therefore, correspondence information stored in the file information storing part 17 also contains information for specifying an application which has controlled secret data to be stored.

(1-2-2. Concrete Example of Data Storing Process)

Figure 3:
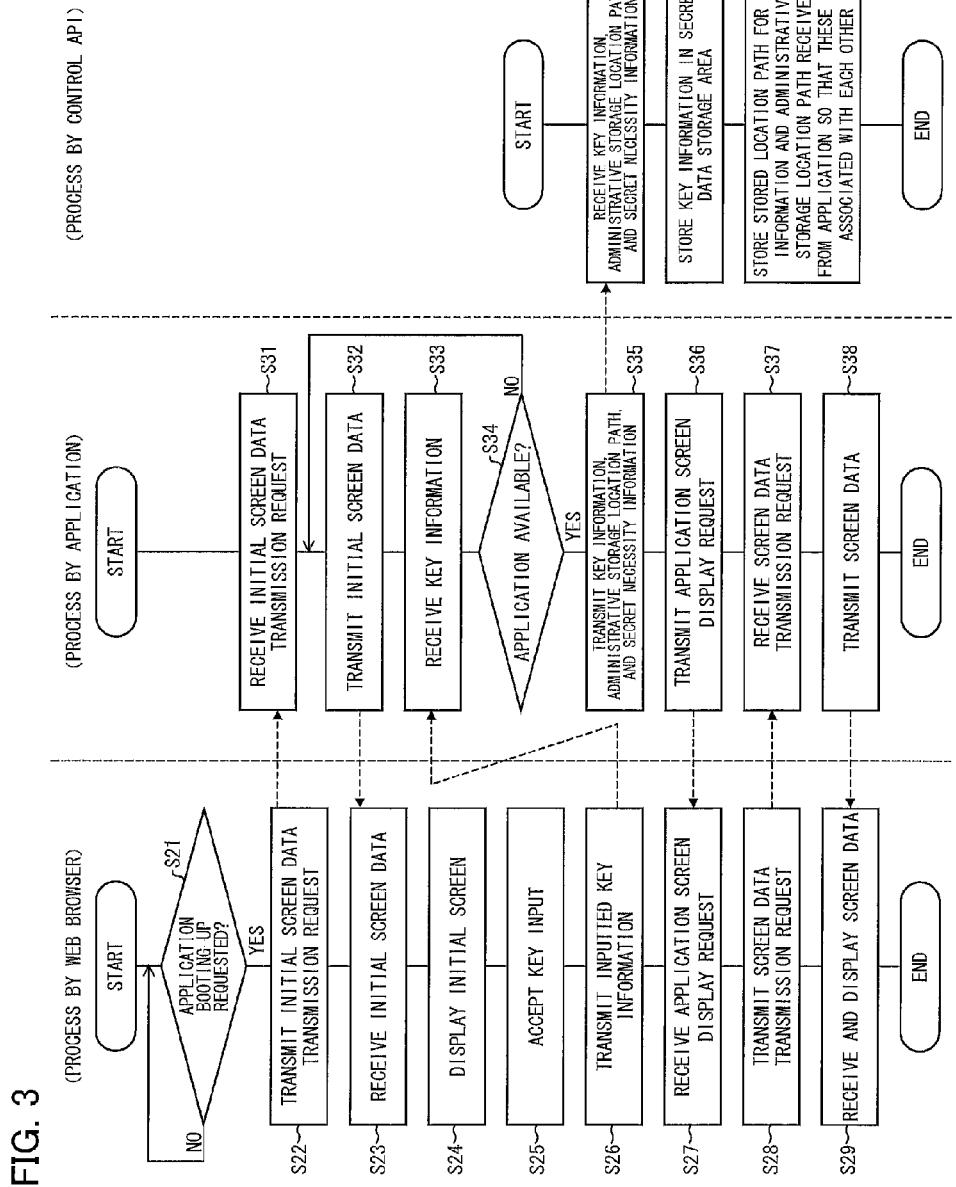
FIG. 3 is a flowchart illustrating a concrete example of processes carried out when a web application controls authentication information to be stored in a storing section, in the multifunction peripheral illustrated in FIG. 1.

The following description will discuss a concrete example of a process for storing, in the storing section 12, data to be used in an application that runs on the web server section 11. A case will be described below where (i) a user needs to enter a license key (authentication key) for booting up an application that runs on the web server section 11 and (ii), when an appropriate license key is entered, the license key is stored as secret data in a secret data storage area of the storing section 12. FIG. 3 is a flowchart showing processes carried out in the above case.

The web browser section 7 judges whether or not a request for booting up an application (which runs on the web server section 11) has been entered by a user from the input section 5 (S21).

In a case where the web browser section 7 determines that a request for booting up an application has been entered, the web browser section 7 transmits, to the web server section 11, a request for transmitting initial screen data of the application (S22). Specifically, in screen data for selecting an application, applications are associated with respective destinations to each of which a request for transmitting initial screen data of a corresponding one of the applications is to be transmitted. With the configuration, the web browser section 7 requests initial screen data by transmitting an HTTP request to a destination corresponding to an application selected by the user.

Upon receipt of the request for transmitting initial screen data of the application from the web browser section 7 (S31), the web server section 11 (i) reads out initial screen data of the application from a public data storage area of the storing section 12 which public data storage area corresponds to the application, and then (ii) transmits the initial screen data, which has been read out, to the web browser section 7 (S32). Note that a method for reading out data from a public data storage area will be described later.

Upon receipt of the initial screen data from the web server section 11 (S23), the web browser section 7 controls the display section 6 to display an initial screen in accordance with received initial screen data (S24). FIG. 4 is an explanatory view illustrating an example initial screen of an application displayed on the display section 6. In the example initial screen illustrated in FIG. 4, an input screen for entering a license key, based on which it is determined whether or not an application is available, is displayed as an initial screen. On the operation screen, the user enters a license key by (i) typing the license key onto the input section 5 and then (ii) pressing an OK button.

Upon receipt of a license key entered by the user from the input section 5 (S25), the web browser section 7 transmits key information, indicative of an entered license key, to the web server section 11 (i.e., to the application running on the web server section 11) (S26).

Upon receipt of the key information from the web browser section 7 (S33), the application judges whether or not to permit use of the application based on a comparison between (i) received key information and (ii) certificate key information which has been stored, in advance, in a secret data storage area corresponding to the application (S34).

The certificate key information is not necessarily be configured so that the certificate key information has been stored in the secret data storage area of the storing section 12. Alternatively, certificate key information can be stored in an external device, which is communicably connected with the multifunction peripheral 1, so that an application that runs on the web server section 11 obtains the certificate key information from the external device. Alternatively, the following configuration can be employed, that is, (i) an application running on the web server section 11 transmits, to an external device (certificate server), key information which has been supplied from the web browser section 7, (ii) the external device carries out a certification process based on a comparison between the key information and certificate key information which has been stored in the external device in advance, and then (iii) a result of the certification process is transmitted to the application.

In a case where the application determines that the application is not available (i.e., the received key information does not match the certificate key information) in the step S34, the process returns to the step S32. The application transmits the initial screen data to the web browser section 7 so that the initial screen is displayed again for prompting a reentering of another license key. At the time, the initial screen can display a message indicating that a previously entered license key was invalid.

On the other hand, in a case where the application determines that the application is available (i.e., the received key information matches the certificate key information) in the step S34, the application transmits, to the control API 10, (i) the key information (storage data), (ii) an administrative storage location path with which the application manages a location in which the key information is to be stored, and (iii) secret necessity information of the key information (in this case, information indicating that the key information is secret data) (S35).

Moreover, the application transmits to the web browser section 7 a request for displaying an application screen (S36). Specifically, the application requests the web browser section 7 to display an application screen by use of an HTTP redirect. The HTTP redirect is a request for displaying another screen by, instead of transmitting screen data, setting and transmitting URL information for specifying the another page screen with the use of an HTTP status code 302 or the like. The HTTP redirect is a known technique which is widely used in HTTP protocols.

Upon receipt of a request (HTTP redirect request) for displaying an application screen (S27), the web browser section 7 transmits, to the web server section 11, a request for transmitting specified screen data (S28). Upon receipt of the request for transmitting screen data (S37), the web server section 11 transmits requested screen data to the web browser section 7 (S38). The web browser section 7 (i) receives screen data of the application screen from the web server section 11, and then (ii) controls the display section 6 to display the application screen (S29).

The control API 10 carries out processes similar to those of the steps S12 through S15 upon receipt of the key information, the administrative storage location path of the key information, and the secret necessity information of the key information (S40) each of which has been transmitted from the application in the step S35. As such, the control API 10 (i) changes the administrative storage location path (administrative storage location information), which has been received from the application, into a storing location path (storing location information) of a secret data storage area corresponding to the application and then (ii) controls the key information, received from the application, to be stored in the secret data storage area (S41). Moreover, the control API 10 controls the file information storing part 17 to store (i) the storing location path (storing location information) indicative of a location in which the key information is stored and (ii) the administrative storage location path (administrative storage location information), which has been received from the application, so that the storing location path and the administrative storage location path are associated with each other (S42). The key information of the license key, which has been entered by the user and has been determined to be valid, is thus stored in the secret data storage area. As such, in a case where, for example, a plurality of license keys (a plurality of licenses) are employed, it is possible to check which one of the plurality of license keys has been used or has not yet been used.

(a) of FIG. 5 is an explanatory view illustrating an example file structure in the storing section 12. According to the example file structure, a root folder (wwwroot) is provided in the storing section 12 (see (a) of FIG. 5). The root folder (wwwroot) is a root folder on a file system of the web server section 11. Applications, which run on the web server section 11, are provided within a hierarchical structure of the root folder. In the example illustrated in (a) of FIG. 5, application folders (App-A, App-B, and so forth) which correspond to respective applications (A, B, and so forth) are provided within the root folder (wwwroot). Note that the root folder (wwwroot) corresponds to public data storage areas illustrated in FIG. 1, and the application folders (App-A, App-B, and so forth) correspond to the respective public data storage areas (13a, 14a, and so forth).

Each of the application folders stores corresponding pieces of data such as initial screen data (App-A Default.html, App-B Default.html), application screen data (TopPage.html), and image data (image.jpg, image2.bmp).

With the hierarchical structure, the web browser section 7 makes an HTTP request to a URL <http://localhost/App-A/App-A Default.html> so as to access "App-A Default.html" in the application folder App-A. This allows the web browser section 7 to obtain information such as screen information.

(b) of FIG. 5 is an explanatory view illustrating an example file structure in the storing section 12 in which key information is stored in the step S41. In a case where secret data is stored, the control API 10 (i) prepares, in the storing section 12, a secret folder (Security) to which only the control API 10 has access and which is outside the root folder (wwwroot) and (ii) controls the secret data to be stored in the secret folder (see (b) of FIG. 5).

Specifically, the control API 10 (i) prepares, in the secret folder (Security), application folders (App-A, App-B, and so forth) for respective applications and (ii) controls pieces of secret data, which relate to the respective applications, to be stored in the respective application folders within the secret folder (Security). In the example illustrated in (b) of FIG. 5, key information (key.txt) of a license key relating to the application A is stored in the application folder App-A prepared within the secret folder (Security). Note that (i) the secret folder (Security) corresponds to the secret data storage areas illustrated in FIG. 1 and (ii) the application folders (App-A, App-B, and so forth) in the secret folder (Security) correspond to the respective secret data storage areas (13b, 14b, and so forth).

(1-2-3. Data Reading-Out Process (Accessing Process))

The following description will discuss a process for reading out, from the storing section 12, data used in an application that runs on the web server section 11, with reference to a flowchart of FIG. 6.

The application (web server section 11) first judges whether or not a process, in which data should be read out from the storing section 12, has occurred (S51).

In a case where it is determined that such a process has occurred, the application transmits, to the control API 10, (i) a request for reading out data (hereinafter, referred to as "data-read-out request") and (ii) an administrative storage path (administrative storage location information), in the application, of data which is to be read out (S52).

Upon receipt of, from the application, the data-read-out request and the administrative storage path (S61), the control API 10 judges whether or not the administrative storage path corresponds to secret data, based on correspondence information stored in the file information storing part 17 (S62). Alternatively, the control API 10 can judge whether or not the administrative storage path corresponds to secret data, based on information which (i) has been transmitted together with the data-read-out request and the administrative storage path, which are transmitted in the step S52 by the application and (ii) indicates whether or not the data to be read out is secret data.

In a case where the control API 10 determines that the administrative storage path does not correspond to secret data in the step S62, the control API 10 reads out corresponding data from a storage area in the public data storage area, which storage area corresponds to the administrative storage path (administrative storage location information) received from the application (S63), and then the control API 10 transmits read-out data to the application (S68).

On the other hand, in a case where the control API determines that the administrative storage path corresponds to secret data in the step S62, the control API 10 judges whether or not the application, from which the data-read-out request has been transmitted, matches an application corresponding to the secret data to be read out (S64).

Specifically, since an application, which is running on the web server section 11, is registered on a system area, the control API 10 detects a running application based on information registered on the system area. More specifically, in a case where the application A is running, "app-A" (full path: wwwroot/App-A) is detected. Alternatively, in a case where the application B is running, "app-B" (full path: wwwroot/App-B) is detected. The control API 10 judges whether or not a full path of the running application matches "wwwroot/App-A" by comparing the full path with "wwwroot/App-A", which is obtained by removing a file name "key.txt" from an argument "wwwroot/App-A/key.txt" of a function "file ( )" indicative of a file to be read out.

In a case where the control API 10 determines in the step S64 that the application from which the data-read-out request has been transmitted does not match an application corresponding to secret data to be read out, the control API 10 transmits, to the application, a notification (access denial notification) indicating that an access to the secret data is denied (S65).

In a case where, for example, a data-read-out request (access request) is transmitted from "wwwroot/App-B" to a file (wwwroot/App-A/key.txt), the control API 10 denies a reading-out of the file (i.e., access to the file). This is because an application name registered on the system area (i.e., application name of a running application) is "App-B" (full path: wwwroot/App-B) which does not match an argument (i.e., "wwwroot/App-A" which is obtained by removing a file name "key.txt" from an argument "wwwroot/App-A/key.txt") of the file for which the access request has been made.

On the other hand, in a case where the control API 10 determines in the step S64 that the application from which the data-read-out request has been transmitted matches an application corresponding to secret data to be read out, the control API 10 reads out, from correspondence information stored in the file information storing part 17, a storing location path (storing location information) which is indicative of a location in which the secret data is actually stored, which storing location path is stored so as to be associated with an administrative storage location path (administrative storage location information) which is transmitted from the application (S66). Then, the control API 10 (i) reads out data, which corresponds to the storing location path read out from the file information storing part 17, from the secret data storage area (S67) and (ii) transmits the data to the application from which the data-read-out request has been transmitted (S68).

Upon receipt of response data from the control API (S53), the application carries out a process in accordance with the response data (S54). In a case where, for example, the application receives an access denial notification, the application controls the display section 6 to display a message indicative of the access denial. Alternatively, in a case where the application receives data in response to its data-read-out request, the application (i) controls the display section 6 to display an image in accordance with received data and/or (ii) carries out a process by using the received data.

Subsequently, the application determines whether the application should end (S55). In a case where the application determines that the application should not end, the process returns to the step S51.

According to the processes illustrated in FIG. 6, whether or not to permit an access to secret data is judged based on whether or not an application, which has transmitted a data-read-out request, matches an application corresponding to the secret data to be read out. Note, in this case, that whether or not to permit the access to the secret data can be ultimately judged, additionally based on whether or not a user, who has made the data-read-out request, is an authorized user. FIG. 11 is a flowchart showing an example process in this case, in which data, used in an application that runs on the web server section 11, is read out from the storing section 12. For convenience, the identical reference numerals are given to processes in FIG. 11 which processes are identical with those illustrated in FIG. 6, and descriptions of such processes are omitted here.

According to processes illustrated in FIG. 11, in a case where an application determines in a step S51 that a process, in which data should be read out, has occurred, the application transmits, to the control API 10, (i) a data-read-out request, (ii) an administrative storage path (administrative storage location information), in the application, of data to be read out, and (iii) a user ID (user identification information) of a user who is utilizing the application (S52b). Then, the control API 10 receives, from the application, the data-read-out request, the administrative storage path, and the user ID (S61b).

In a case where the control API 10 determines in a step S64 that the application which has transmitted the data-read-out request matches an application corresponding to secret data to be read out, the control API 10 judges whether or not the user ID received in the step S61b is authorized (S64b). The control API 10 judges whether or not the user ID is valid by, for example, checking whether or not the user ID received in the step S61b matches one of user IDs in a table, stored in the secret data storage area 16 in advance, in which table a user ID (authorized user information) of a user who can have access to secret data of an application is stored for each of applications.

In a case where the control API 10 determines that the user ID is invalid, the process proceeds to a step S65. Whereas, in a case where the control API 10 determines that the user ID is valid, the process proceeds to a step S66.

(1-2-4. Data Deletion Process)

The following description will discuss a deletion process for deleting an application registered with the multifunction peripheral 1. FIG. 7 is a flowchart showing a flow of processes for deleting an application.

When the device control section 8 accepts an instruction on deleting an application, which instruction is entered by a user from an operating section 4 (S71), the device control section 8 transmits, to the control API 10, a request (containing a deletion command and an application name of an application to be deleted) for deleting an application that the user has instructed to delete (hereinafter, the request for deleting an application is referred to as "application deletion request") (S72). Specifically, the device control section 8 has a native application (a program inherent to the multifunction peripheral 1; a deletion application) for carrying out a deletion of an application. The device control section 8 executes the native application so as to transmit, to the control API 10, an application deletion.

Upon receipt of the application deletion request from the device control section 8 (S81), the control API 10 deletes data of the application from a public data storage area (S82). In a case where, for example, the application A is to be deleted, data stored in the public data storage area 13a of the data storage area 13 is deleted. That is, data stored in a location indicated by a file path "wwwroot/App-A" is deleted.

Then, the control API 10 judges whether or not secret data of the application is stored in a secret data storage area (S83). As early described, the control API 10 controls the file information storing part 17 to store correspondence information indicative of a correspondence between (i) an administrative storage location path (administrative storage location information) handled by a file system of the web server section 11 and (ii) a storing location path (storing location information) indicative of a location in which secret data is actually stored. By referring to the correspondence information, the control API 10 judges whether or not secret data, which corresponds to the application to be deleted, is stored in a secret data storage area.

Alternatively, the control API 10 can judge whether or not secret data corresponding to the application to be deleted is stored in a secret data storage area based on a directory in the secret data storage area, which directory (i) corresponds to an application to be deleted and (ii) has been extracted by (a) the native application that runs on the device control section 8 or (b) the control API 10 based on history information of directory. Note that the history information of directory, which directory the control API 10 has accessed, is stored in advance in the file information storing part 17.

In a case where the control API 10 determines that the secret data is not stored, the control API 10 ends the process.

On the other hand, in a case where the control API 10 determines that secret data of the application to be deleted is stored, the control API 10 deletes (i) the secret data of the application which secret data is stored in a secret data storage area (S84) and (ii) correspondence information relating to the secret data, which has been deleted from the secret data storage area, out of pieces of correspondence information stored in the file information storing part 17 (S85). Then, the control API ends the deletion process. In a case where, for example, the application A is deleted, data stored in the secret data storage area 13b (i.e., file path: Security/App-A) in the data storage area 13 is deleted. This allows the file to be surely deleted, and ultimately allows no file of a deleted application to be left even in a case where an application has stored an arbitrarily prepared file.

According to the example process illustrated in FIG. 7, in a case where an instruction on deleting an application is issued, (i) data of the application which data is stored in a public data storage area and (ii) data of the application which data is stored in a secret data storage area are all deleted. Note, however, that the present embodiment is not limited to this. For example, at least part of data, which has been prepared by an application before the application is deleted, can be left instead of being deleted.

In a case where, for example, an application is updated, at least part of secret data (e.g., setting information of the application itself and user information) corresponding to the application can be left instead of being deleted so that the at least part of secret data can continue to be available even after the updating of the application. This eliminates the need for reentering of setting information and user information, and therefore improves the convenience for a user.

Alternatively, in a case where an application is deleted, it is possible that (i) at least part of secret data (e.g., setting information of the application itself and user information) corresponding to the application is left instead of being deleted at the time when the application is deleted and then (ii) the at least part of secret data is deleted if a deleted application (or an upgraded version of the application) is not reinstalled even after a predetermined time period has elapsed since the deletion of the application. In this case, the native application (i.e., a deletion program) that runs on the device control section 8 requests the control API 10 to delete a remaining file relating to the deleted application, after a predetermined period has elapsed since the native application issued an instruction on deleting the application to the control API 10. For example, the native application stores a date when a deletion instruction was issued, and the native application judges, each time a power supply of the multifunction peripheral 1 is turned on, whether or not a predetermined period has elapsed since the date. Then, in a case where the native application determines that the predetermined period has elapsed, the native application requests the control API 10 to delete the remaining file. With the configuration, in a case where an application is deleted and then the application is reinstalled, it is possible to eliminate the need for reentering of setting information and user information, and is therefore possible to improve a convenience for a user. It is further possible to prevent an unnecessary file from continuously remaining in the multifunction peripheral 1.

Alternatively, when an application deletion request is transmitted in the step S72, the device control section 8 can notify the control API 10 of deletion method information, which is indicative of whether a normal deletion or a complete deletion should be carried out, so that the control API 10 carries out the deletion processes in the steps S84 and S85 in accordance with the deletion method information. Note that the complete deletion refers to a process in which information to be deleted is irrecoverably deleted, by causing random data to be overwritten into a storage area in which the information to be deleted is stored. For example, the device control section 8 can select a normal deletion or a complete deletion by referring to a table (i) which is stored in advance and (ii) in which whether to carry out a normal deletion or a complete deletion is specified for each of applications. Alternatively, the device control section 8 can select a normal deletion or a complete deletion in accordance with a selection instruction issued by a user.

(1-2-5. Modification of Data Storing Process)

According to the foregoing example shown in FIG. 2, the application that runs on the web server section 11 controls, via the control API 10, the storing section 12 to store data, regardless of whether or not the data is secret data. The present embodiment is, however, not limited to this. For example, it is possible that (i) the application controls, via the control API 10, the storing section 12 to store secret data and (ii) the application directly controls the storing section 12 to store data which is not secret data. FIG. 8 is a flowchart showing a process flow of this case.

First, the application (web server section 11) judges whether or not a process (data storing process) in which data is to be stored in the storing section 12 has occurred (S91).

In a case where the data storing process has occurred, the application judges whether or not data to be stored is secret data. That is, the application determines whether to (i) store the data in the storing section 12 such that the data is arbitrarily accessible from outside or (ii) store the data in the storing section 12 such that the data is accessible only via the control API 10 (S92).

In a case where the application determines that the data is not secret data, the application controls the data to be stored in an administrative storage location in a public data storage area of the storing section 12. Note that the administrative storage location corresponds to an administrative target storage location path (i.e., administrative storage location path (administrative storage location information) managed by a file system of the application) (S93). Then, the process proceeds to a step S95.

On the other hand, in a case where the application determines that the data is secret data, the application transmits, to the control API 10, storage data and an administrative storage path specifying a storage location in which the storage data is to be stored (S94). Then, the process proceeds to the step S95.

In the step S95, the application determines whether or not the application should end. In a case where the application determines that the application should not end, the process returns to the step S91.

Upon receipt of the storage data and the administrative storage path (administrative storage location information) from the application (web server section 11) (S101), the control API 10 (i) changes a received administrative storage path into a storing location path (storing location information) for storing secret data and (ii) controls received storage data to be stored in a storage area corresponding to the storing location path (storing location information) (S102). That is, the control API 10 controls the storage data, which has been transmitted from the application (web server section 11), to be stored in a secret data storage area.

Moreover, the control API 10 controls the file information storing part 17 of the storing section 12 to store correspondence information indicative of a correspondence between (i) the storing location path (storing location information) indicative of a location in which the storage data is actually stored in the step S102 and (ii) the administrative storage path (administrative storage location information) which has been received from the application in the step S101 (S103). Then, the process is ended.

(1-2-6. Modification of Data-Read-Out Process (Accessing Process))

According to the foregoing example illustrated in FIG. 6, when the application that runs on the web server section 11 reads out data stored in the storing section 12, the application reads out data from the storing section 12 via the control API 10 regardless of whether or not the data is secret data. However, the present embodiment is not limited to this. For example, it is possible that (i) the application reads out secret data from the storing section 12 (secret data storage area) via the control API 10 and (ii) the application reads out data, which is not secret data, directly from the storing section 12 (public data storage area). FIG. 9 is a flowchart showing a process flow of this case.

First, the application (web server section 11) judges whether or not a process for reading out data from the storing section 12 has occurred (S111).

In a case where it is determined that the process for reading out data has occurred, the application judges whether or not data to be read out is secret data (S112).

In a case where the application determines that the data to be read out is not secret data, the application accesses a public data storage area of the storing section 12 and reads out the data (S113). Then, the process proceeds to a step S117.

On the other hand, in a case where the application determines that the data to be read out is secret data, the application transmits, to the control API 10, a data-read-out request and an administrative storage path (administrative storage location information) of the data to be read out (S114).

Upon receipt of the data-read-out request and the administrative storage path (administrative storage location information) from the application (S121), the control API 10 judges whether or not the application which has transmitted the data-read-out request matches an application corresponding to secret data to be read out (S122). This judgment is carried out in a manner similar to the one early described with reference to FIG. 6.

In a case where the control API 10 determines in the step S122 that the application from which the data-read-out request has been transmitted does not match an application corresponding to secret data to be read out, the control API 10 transmits, to the application, a notification (access denial notification) indicating that an access to the secret data is denied (S123).

On the other hand, in a case where the control API 10 determines in the step S122 that the application from which the data-read-out request has been transmitted matches an application corresponding to secret data to be read out, the control API 10 reads out a storing location path (storing location information) of the secret data which storing location path is stored in the file information storing part 17 so as to be associated with the administrative storage location path (administrative storage location information) which has been transmitted from the application (S124). Then, the control API 10 (i) reads out data, which corresponds to the storing location path read out from the file information storing part 17, from the secret data storage area (S125) and (ii) transmits the data to the application from which the data-read-out request has been transmitted (S126).

Upon receipt of response data from the control API 10 (S114), the application carries out a process in accordance with received response data (S115). In a case where, for example, the application receives an access denial notification, the application controls the display section 6 to display a message indicative of the access denial. Alternatively, in a case where the application receives data in response to its data-read-out request, the application (i) controls the display section 6 to display an image in accordance with received data and/or (ii) carries out a process by using the received data.

Subsequently, the application determines whether the application should end (S117). In a case where the application determines that the application should not end, the process returns to the step S111.

(1-3. Advantage of Multifunction Peripheral 1)

As above described, the multifunction peripheral (information processing device) 1 of the present embodiment includes the web server section 11 for executing the web applications A through C; the storing section (data storing section) 12 for storing data used in the web applications A through C; and the control API (data managing section) 10 for managing data to be stored in the storing section 12, in a case where any of the web applications A through C controls the storing section 12 to store secret data which is opened only to the any of the web applications A through C, the any of the web applications A through C notifying the control API 10 of (i) a data name of the secret data and (ii) an administrative storage location path (administrative storage location information) of the secret data in the any of the web applications A through C, the control API controlling the secret data to be stored in a corresponding one of the secret data storage area 13b, 14b, and 15b in the storing section 12, each of which secret data storage areas 13b, 14b, and 15b is accessible only to the control API 10, and the control API 10 controlling correspondence information to be stored in the file information storing part 17, the correspondence information being indicative of a correspondence between (i) storing location path (storing location information) indicative of a location in which the secret data is actually stored and (ii) the administrative storage location path (administrative storage location information) notified by the any of the web applications A through C.

According to a conventional configuration, in a case where, for example, (i) web applications A, B, and so forth have a folder configuration as illustrated in (a) of FIG. 5 and (ii) the web application A controls key information (key.txt) to be stored as secret data, the key information is stored in an application folder App-A, which corresponds to the application A, in a root folder (wwwroot) in a public data storage area (see FIG. 10). In this case, there has been a security problem that the secret data is accessible to (i) other application that runs on the web server section 11 of the multifunction peripheral 1 or (ii) an external device communicably connected with the multifunction peripheral 1, by use of an HTTP request. Even in this case, of course, only the web application A knows that the key information (key.txt) is stored as secret data. However, there has been a possibility that the key information is accidentally or intentionally leaked if, for example, a user wrongly types a URL or setting information of the web application A is leaked.

On the other hand, according to the present embodiment, the control API 10 prepares a secret folder (Security) (i) which is located (a) in the storing section 12 and (b) outside of a hierarchical structure of the root folder (wwwroot) and (ii) which is accessible only to the control API 10. Further, secret data (key.txt) is stored in an application folder App-A provided in a hierarchical structure of the secret folder.

As such, the secret data is stored in a secret data storage area which is not directly accessible to a web application. This makes it possible to prevent the secret data from being accessed by (i) an application in the multifunction peripheral 1 which application is other than an application which has controlled the secret data to be stored and (ii) an external device communicably connected with the multifunction peripheral 1. Moreover, a web application, which is authorized, can access secret data via the control API 10 by notifying the control API 10 of (i) a data name of the secret data that the web application intends to access and (ii) an administrative storage location path (administrative storage location information) in the web application. This allows an information processing device, which has a web application execution environment, to prevent a leakage of confidential (secret) information and to permit an authorized web application to easily use the confidential information.

According to the present embodiment, when the control API 10 controls secret data to be stored in a secret data storage area, the control API 10 internally changes a part of a file path (e.g., wwwroot/App-A/key.txt), which is indicated by an administrative storage location path (administrative storage location information) notified by a web application, into an actual storing location path (storing location information; e.g., Security/App-A/key.txt) indicative of the secret data storage area in which the secret data is stored. In other words, the control API 10 (i) prepares folders in a secret data storage area for respective web applications, and (ii) controls secret data to be stored in a folder, prepared in the secret data storage area, of a corresponding web application.

With the configuration, an external device (i) can access only a folder (i.e., public folder on the web) in a public data storage area by an HTTP whereas (ii) cannot access a folder in a secret data storage area. This makes it possible to prevent the external device from exploiting secret data. Moreover, the secret data can be stored while a sandbox security model is maintained, as with data other than the secret data. This makes it possible to prevent, more surely, (i) the secret data from being accessed by an unauthorized web application and (ii) a system file from being tampered with. Moreover, the authorized web application can manage secret data and data other than secret data, with the use of a conventional file system.

Note that, in a case where the control API 10 controls secret data to be stored in a secret data storage area, the control API 10 can (i) prepare a folder, in the secret data storage area, for a web application corresponding to the secret data and (ii) control the secret data to be stored in the folder.

According to the configuration, the secret data can be stored in the secret data storage area while a sandbox security model is maintained. This makes it possible to appropriately prevent the secret data from being accessed by an unauthorized web application or an external device. Moreover, it is possible to manage pieces of secret data for respective authorized web applications which correspond to the respective pieces of secret data. This makes it possible to easily judge whether or not a web application, which requests to access secret data, is an authorized web application corresponding to the secret data.

In a case where a web application accesses secret data stored in a secret data storage area, the web application notifies the control API 10 of an access request containing (i) a data name of the secret data and (ii) administrative storage location information of the secret data. Upon receipt of the access request, the control API 10 (i) reads out, from a secret data storage area, storing location information corresponding to the administrative storage location information contained in the access request and (ii) accesses the secret data based on the storing location information.

According to the configuration, a web application can manage secret data and data other than secret data by the use of a single file system. Moreover, the web application can access secret data corresponding to the administrative storage location information via a data managing section, merely by notifying the data managing section of the administrative storage location information managed by a file system of the web application. Therefore, the web application can easily access secret data.

When the control API 10 controls secret data to be stored in a secret data storage area, the control API 10 can control the secret data storage area to store (i) correspondence information indicative of a correspondence between (a) storing location information indicative of a location in which the secret data is actually stored and (b) administrative storage location information notified by a web application and (ii) identification information of a web application corresponding to the secret data so that the correspondence information and the identification information are associated with each other. In this case, when the control API 10 accepts an access request for accessing the secret data, the control API 10 judges, based on the identification information, whether or not a web application which has issued the access request is an application corresponding to the secret data to be accessed. In a case where the web application is not the application corresponding to the secret data to be accessed, the control API 10 denies an access to the secret data.

According to the configuration, it is possible to (i) easily judge whether or not a web application, which has issued an access request for accessing secret data, is an authorized web application corresponding to the secret data and (ii) deny an access request issued by a web application other than the authorized web application.

In a case where the control API 10 deletes a web application, the control API 10 can (i) delete data, which is used in the web application and is not secret data, at the time when the web application is deleted and (ii) delete the secret data if the web application is not reinstalled even after a predetermined period has elapsed since the web application was deleted.

According to the configuration, the secret data corresponding to the web application is stored until the predetermined period has elapsed since the web application was deleted. Therefore, in a case where the web application is reinstalled within the predetermined period, the secret data corresponding to the web application can be used effectively.

According to the present embodiment, the present invention is applied to a multifunction peripheral which includes a web server for executing a web application. However, the application range of the present invention is not limited to this. That is, the present invention is applicable to any device provided that the device is an information processing device which has a function of a web server for executing a web application. Examples of the information processing device, to which the present invention is applicable, encompass a personal computer, a server device, a personal digital assistant, a scanner (image reading device), a printer (image forming apparatus), a copying machine (image forming apparatus), an image editing apparatus (image processing apparatus), an image reproducing apparatus, and an image recorder.

Each section (each block) of the multifunction peripheral 1 of the embodiment of the present invention, in particular, the web browser section 7, the device control section 8, the web server section 11, and the control API 10 may be realized by software with the use of a processor such as CPU. In this case, the multifunction peripheral 1 includes a CPU (central processing unit), a ROM (read only memory), a RAM (random access memory), and a storage device (storage medium) such as a memory. The CPU executes instructions of control programs for realizing the functions. In the ROM, the programs are stored. Into the RAM, the programs are loaded. In the storage device, the programs and various data are stored. The objective of the present invention can be achieved, by (i) supplying a storage medium, in which program codes (executable programs, intermediate code programs, source programs) of programs for controlling the multifunction peripheral 1, each being configured by software for realizing the functions, are stored so that a computer can read them, to the multifunction peripheral 1, and then (ii) causing the computer (or CPU or MPU) to read and execute the program codes stored in the storage medium.

The storage medium can be, for example, a tape, such as a magnetic tape or a cassette tape; a disk including (i) a magnetic disk such as a Floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, the multifunction peripheral 1 can be arranged to be connected to a communications network so that the program codes are delivered over the communications network. A configuration of the communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal (i) which is realized by electronic transmission of the program code and (ii) which is embedded in a carrier wave.

Each block of the multifunction peripheral 1 is not limited to one realized by use of software but can be configured by hardware logic. Alternatively, each block of the multifunction peripheral 1 can be realized by a combination of (i) hardware for partially carrying out processes and (ii) operation means for executing software which controls the hardware and carries out the other of the processes.

As above described, the information processing device of the present invention includes a web server section for executing a web application; a data storing section for storing data used in the web application; and a data managing section for managing data to be stored in the data storing section, in a case where the web application controls the data storing section to store secret data which is opened only to the web application, the web application notifying the data managing section of (i) a data name of the secret data and (ii) administrative storage location information of the secret data in the web application, the data managing section controlling the secret data to be stored in a secret data storage area in the data storing section, which secret data storage area is (i) different from a storage area corresponding to the administrative storage location information and (ii) accessible only to the data managing section, and the data managing section controlling correspondence information to be stored in the secret data storage area, the correspondence information being indicative of a correspondence between (i) storing location information indicative of a location in which the secret data is actually stored and (ii) the administrative storage location information notified by the web application.

According to the configuration, the secret data is stored in the secret data storage area which is accessible only to the data managing section. It is therefore possible to block an access, to the secret data, from (i) an application other than an application in the information processing device which application has controlled the secret data to be stored or (ii) an external device communicably connected with the information processing device. Moreover, a web application, which is authorized, can access the secret data via the data managing section by notifying the data managing section of (i) a data name of the secret data that the web application intends to access and (ii) administrative storage location information in the web application. This allows an information processing device, which has a web application execution environment, (i) to prevent a leakage of confidential information and (ii) to permit an authorized web application to easily use the confidential information.

It is possible that, in a case where the web application controls the data storing section to store data, the web application notifies the data managing section of (i) a data name of the data, (ii) administrative storage location information of the data in the web application, and (iii) information indicative of whether or not the data is secret data; in a case where the data notified by the web application is secret data, the data managing section controls (i) the secret data and (ii) correspondence information relating to the secret data to be stored in the secret data storage area; and in a case where the data notified by the web application is not secret data, the data managing section controls the data to be stored in a storage area which is in the data storing section and is accessible to the web application. Alternatively, it is possible that, in a case where the web application controls the data storing section to store data which is not secret data, the web application controls the data to be stored in a storage area which is in the data storing section and is directly accessible to the web application.

According to the configurations, it is possible to prevent a leakage of confidential information by causing the secret data to be stored in the secret data storage area. Moreover, by causing data other than the secret data to be stored in the storage area accessible to the web application, it is possible to improve convenience of the data.

The information processing device can further include a deletion application for carrying out a process in which a web application registered with said information processing device is deleted, in a case where a registered web application is deleted, the deletion application notifying the data managing section of identification information of the registered web application to be deleted, and the data managing section deleting, from the secret data storage area, pieces of data which the registered web application, corresponding to the identification information, has controlled to be stored in the secret data storage area directly or via the data managing section.

According to the configuration, in a case where a web application is deleted, secret data corresponding to the web application can also be deleted.

It is possible that the web application notifies the data managing section of user identification information of a user who is utilizing the web application; in a case where the web application issues an access request for accessing secret data corresponding to the web application, the data managing section checks whether or not the user identification information matches authorized user information which (i) has been stored in advance and (ii) is identification information of a user who is authorized to access the secret data; and in a case where the user identification information does not match the authorized user information, the data managing section denies an access to the secret data.

According to the configuration, it is possible to judge whether to permit an access to the secret data for each user.

A multifunction peripheral of the present invention has a plurality of device functions and includes any of the information processing devices above described. In the multifunction peripheral, the web application controls the plurality of device functions.

According to the configuration, in a multifunction peripheral having a web application execution environment, it is possible to (i) prevent a leakage of confidential information and (ii) allow an authorized web application to easily use the confidential information.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The present invention is applicable to an information processing device which includes a web server section for executing a web application.

REFERENCE SIGNS LIST

1: Multifunction peripheral (information processing device)
2: Image reading section
3: Image forming section
4: Operating section
5: Input section
6: Display section
7: Web browser section
8: Device control section
9: Communication section
10: Control API (data managing section)
11: Web server section
12: Storing section (data storing section)
13: Data storage area for application A
13a, 14a, and 15a: Public data storage area
13b, 14b, and 15b: Secret data storage area
14: Data storage area for application B
15: Data storage area for application C
16: Secret data storage area
17: File information storing part

The invention claimed is:

1. An information processing device comprising:
a web server section for executing, by a processor device, a web application;
a data storing section for storing data used in the web application; and
a data managing section for managing data to be stored in the data storing section in a case where the web application controls the data storing section to store secret data which is associated and applicable only to said web application, the web application notifying the data managing section of (i) a data name of the secret data and (ii) administrative storage location information of the secret data in the web application which is different from an actual location storing said secret data, wherein the data managing section controlling the secret data to be stored in a secret data storage area in the data storing section, which secret data storage area is (i) different from a storage area corresponding to the administrative storage location information, (ii) accessible only to the data managing section, and (iii) not accessible directly by the web application, and the data managing section controlling correspondence information to be stored in the secret data storage area, the correspondence information being indicative of a correspondence between (i) storing location information indicative of a location in which the secret data is actually stored and (ii) the administrative storage location information notified by said web application.

2. The information processing device as set forth in claim 1, wherein: in a case where the web application controls the data storing section to store data, the web application notifies the data managing section of (i) a data name of the data, (ii) administrative storage location information of the data in the web application, and (iii) information indicative of whether or not the data is secret data; in a case where the data notified by the web application is secret data, the data managing section controls (i) the secret data and (ii) correspondence information relating to the secret data to be stored in the secret data storage area; and in a case where the data notified by the web application is not secret data, the data managing section controls the data to be stored in a storage area which is in the data storing section and is accessible to the web application.

3. The information processing device as set forth in claim 1, wherein: in a case where the web application controls the data storing section to store data which is not secret data, the web application controls the data to be stored in a storage area which is in the data storing section and is directly accessible to the web application.

4. An information processing device as set forth in claim 1, further comprising: a deletion application for carrying out a process in which a web application registered with said information processing device is deleted, in a case where a registered web application is deleted, the deletion application notifying the data managing section of identification information of the registered web application to be deleted, and the data managing section deleting, from the secret data storage area, pieces of data which the registered web application, corresponding to the identification information, has controlled to be stored in the secret data storage area directly or via the data managing section.

5. The information processing device as set forth in claim 1, wherein: the web application notifies the data managing section of user identification information of a user who is utilizing the web application; in a case where the web application issues an access request for accessing secret data corresponding to the web application, the data managing section checks whether or not the user identification information matches authorized user information which (i) has been stored in advance and (ii) is identification information of a user who is authorized to access the secret data; and in a case where the user identification information does not match the authorized user information, the data managing section denies an access to the secret data.

6. A multifunction peripheral having a plurality of device functions, said multifunction peripheral comprising an information processing device recited in claim 1, the web application controlling the plurality of device functions.

* * * * *